3,334,134
IODINE-CONTAINING BENZOIC ACID DERIVATIVES
Werner Obendorf and Heimo Stormann-Menninger, Linz, Austria, assignors to Österreichische Stickstoffwerke Aktiengesellschaft, Linz, Austria
No Drawing. Filed Feb. 2, 1962, Ser. No. 170,823
Claims priority, application Austria, Feb. 11, 1961, A 1,147/61
4 Claims. (Cl. 260—518)

This invention relates to novel 3-acylamino-2,4,6-triiodobenzoic acid amides.

The novel iodine-containing aminobenzoic acid amides of the present invention are useful X-ray contrast agents, for intravenous cholecystography and cholangiography.

The present invention provides 3-acylamino-2,4,6-triiodobenzoic acid amides having the general formula:

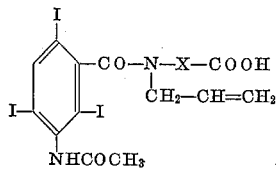

in which X is an ethylene or α-methyl-dimethylene group. Preferably the compounds according to the invention are used in the form of their sodium or N-methylglucamine salts.

It has been found that the novel compounds of Formula I are excellent for use in X-ray diagnosis because of their low toxicity and satisfactory compatibility. They are used in the form of X-ray contrast compositions comprising the free acid, or non-toxic salt thereof, and a non-toxic carrier therefor. A preferred use is for intravenous cholangiography and cholecystography. For such a use the compounds are used as aqueous solutions of their non-toxic salts. Non-toxic salts may be formed with all the organic and inorganic bases which are conventionally used as an ingredient of salts for X-ray contrast agents. There may be particularly mentioned the sodium salts, the lithium salts, the N-methylglucamine salts and the glucamine salts, the diethanolamine salts and the diethylamine salts. The X-ray contrast compositions according to the present invention are suitable for administration in the form of a concentrated or dilute solution by injection or infusion.

The present invention also provides a process of preparing a compound of Formula I herein, or a non-toxic salt thereof, which comprises reacting, at an elevated temperature, an acid chloride of the general formula

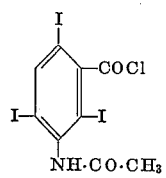

wherein Z is as hereinbefore defined, with an ester of an amino acid of the general formula

HN—X—COOY
|
CH₂—CH=CH₂     III

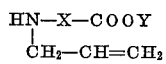

wherein Y is an alkyl group and X is as hereinbefore defined, and hydrolysing or saponifying the resulting alkyl ester of the compound of Formula I herein to obtain the free acid of Formula I herein or a non-toxic salt thereof respectively. Alkaline agents, preferably alcoholic alkali liquors, may be used for saponification.

The reaction may be performed either without solvents or in the presence of inert organic solvents, such as acetone, dioxane or benzene.

The salts of the compounds according to the invention can be prepared quite simply by reacting the free acids of Formula I with the equivalent quantity of an organic or inorganic base. The alkali metal salts can be prepared directly from the alkaline saponification solution by precipitation with an organic solvent, such as ether.

The acylamino acid chlorides of Formula II can be prepared by acylation of 3-amino-2,4,6-triiodobenzoyl chloride with the appropriate acid chlorides or acid anhydrides. The following examples are given to illustrate the present invention.

EXAMPLE 1

28.7 g. of 3-acetylamino-2,4,6-triiodobenzoyl chloride are dissolved in 30 cc. of acetone and mixed slowly with a solution of 14.3 g. of β-allylaminopropionic acid methyl ester. With sponataneous generation of heat, there is formed acetylamino-2,4,6-triiodobenzoyl-N-allyl-β-aminopropionic acid methyl ester. The acetone solution is then subjected to evaporation, and the evaporation residue is taken up in chloroform. The chloroform solution is then treated with dilute acid, water, potassium bicarbonate solution and water, and is then dried and concentrated to give 32.3 g. of crude ester. By recrystallisation from 30 cc. of methanol, 24.6 g. of pure methyl ester having a melting point of from 160° to 164° C. are obtained, the yield being 70.7% of the theoretical figure.

23.6 g. of this ester are suspended in 30 cc. of methanol mixed with 15 cc. of 3.3 N methanolic sodium hydroxide and heated in a water bath for half an hour. The methanolic solution is then poured into about 2 litres of water, hydrochloric acid is added at room temperature, and the free acid is precipitated. The resulting mixture is heated, when the precipitate agglomerates, and is filtered. After drying on phosphorus pentoxide, 18.5 g. of N-(3 - acetylamino - 2,4,6 - triiodobenzoyl)-N-allyl-β-aminopropionic acid having a melting point of from 106° to 135° C. are obtained. This yield is 80.0% of the theoretical figure, and the total yield is 56% of the theoretical figure.

The sodium salt is prepared from the acid by dissolving the acid in methanol and adding an equivalent quantity of sodium, methylate, and ether.

The following compound may be prepared in a similar fashion:

N-(3-acetylamino-2,4,6-triiodobenzoyl)-N-allyl-β-amino-α-methylpropionic acid, melting point 244°–246° C.

The compounds of this invention were subjected to pharmacological experimental methods to test them for their suitability as X-ray contrast agents for intravenous cholangiography and cholecystography. Extended tests were made for toxicity, compatibility, effect on blood pressure and haemolytic action, and contrast tests were made on cats. Accordingly, from 100 to 150 mg./kg. of body weight of contrast agent were injected into the front leg veins of the animals when awake. It was found in these experiments that, as a rule, the shadow of the gall bladder became visible after as little as 30 minutes. The compounds of the invention, in addition to enabling the gall bladder to be shown so quickly, have excellent compatibility.

The rapid visualisation of gall ducts and gall bladder, together with very good compatibility, was confirmed in clinical experiments.

EXAMPLE 2

0.061 mol of the ethyl ester of N-(3-acetylamino-2,4,6-triiodobenzyl)-N-methyl-β-aminopropionic acid are suspended in 50 cc. of methanol, mixed with a stoichiometric quantity of about 3 N methanolic caustic soda solution, and heated in a water bath until a specimen of the reaction product is clearly soluble in water. After cooling, the resulting solution is poured into about 1500 cc. of ether. The sodium salt of the acid precipitates out, is separated and washed with ether and dried. The yield is 0.055 mol of sodium salt, corresponding to 90% of the theoretical figure.

The following compounds are prepared similarly:

N-(3-acetylamino-2,4,6-triiodobenzoyl)-N-allyl-$\beta$-amino-propionic acid sodium salt, N-(3-acetylamino-2,4,6-triiodobenzoyl)-N-allyl-$\beta$-amino-$\alpha$-methyl-propionic acid sodium salt.

EXAMPLE 3

0.238 mol of N-(3-propionylamino-2,4,6 - triiodobenzoyl)-N-allyl-$\beta$-aminopropionic acid are dissolved in 300 cc. of hot methanol and mixed with 0.238 mol of N-methyl glucamine, the pH of the solution being 7.3. The mixture is poured with agitation into 100 cc. of ether, when the N-methyl-glucamine salt separates out. This salt is isolated and dried. The yield is 0.227 mol, corresponding to 95% of the theoretical figure.

The other compound of the invention can be converted into their methylglucamine salt in the same way.

EXAMPLE 4

66.804 g. of N-(3-acetylamino-2,4,6-triiodobenzoyl)-N-allyl-$\beta$-aminopropionic acid are dissolved in 200 cc. of a 0.5 N caustic soda solution and diluted to a total volume of 345 cc. There results a solution of 20 g. of sodium salt per 100 cc. of solution, which is suitable for injection. The N - (3 - acetylamino - 2,4,6-triiodobenzoyl) - N - allyl-$\beta$-aminopropionic acid may alternatively be dissolved in a stoichiometric quantity of an aqueous solution of diethanolamine or methylglucamine, to produce a solution of the diethanolamine salt or of the methylglucamine salt.

EXAMPLE 5

1028 g. of N-(3-acetylamino-2,4,6-triiodobenzoyl)-N-allyl-$\beta$-aminopropionic acid are dissolved in a stoichiometric quantity of 0.5 N caustic soda solution, and the solution is adjusted to a pH of 7.4. The solution thus prepared is diluted to 10,000 cc. and after filtration dispensed in portions of 90 cc. into infusion bottles. The resultant solution is isotonic with blood and of use as an infusion solution for cholangiocystography. Infusion solutions can be prepared in a similar way from the other acids of this invention.

We claim:

1. Sodium-N-(3-acetylamino - 2,4,6-triiodobenzoyl)-N-allyl-$\beta$-amino propionate.

2. Sodium-N-(3-acetylamino - 2,4,6 - triiodobenzoyl)-N-allyl-$\beta$-amino-$\alpha$-methyl propionate.

3. The salt of an iodine containing amino benzoic acid amide compound of the formula

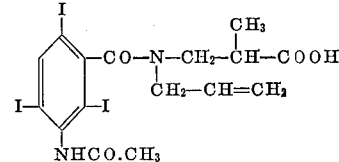

with a non-toxic base.

4. The salt of an iodine containing amino benzoic acid amide compound of the formula

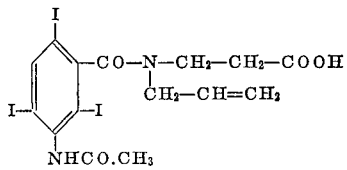

with a non-toxic base.

References Cited

UNITED STATES PATENTS

| | | | |
|---|---|---|---|
| 2,611,786 | 9/1952 | Wallingford | 260—518 |
| 2,840,602 | 6/1958 | Larsen | 260—518 |
| 2,939,881 | 6/1960 | Wiegert | 260—518 |
| 3,042,715 | 7/1962 | Obendorf et al. | 260—518 |
| 3,051,745 | 8/1962 | Obendorf | 260—518 |

LORRAINE A. WEINBERGER, *Primary Examiner.*

CHARLES B. PARKER, DANIEL D. HORWITZ,
*Examiners.*

G. P. D'ANGELO, L. A. THAXTON,
*Assistant Examiners.*